(12) United States Patent
Goodman

(10) Patent No.: US 9,468,922 B1
(45) Date of Patent: Oct. 18, 2016

(54) CARBON MONOLITH SUPPORTED NANOPARTICLE CATALYSTS

(71) Applicant: Paul A. Goodman, Ridgecrest, CA (US)

(72) Inventor: Paul A. Goodman, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/737,085

(22) Filed: Jun. 11, 2015

(51) Int. Cl.
| | |
|---|---|
| B01J 37/08 | (2006.01) |
| B01J 23/42 | (2006.01) |
| B01J 23/44 | (2006.01) |
| B01J 23/52 | (2006.01) |
| B01J 21/18 | (2006.01) |
| B01J 35/00 | (2006.01) |
| B01J 35/10 | (2006.01) |
| B01J 37/03 | (2006.01) |

(52) U.S. Cl.
CPC ............... *B01J 37/084* (2013.01); *B01J 21/18* (2013.01); *B01J 23/42* (2013.01); *B01J 23/44* (2013.01); *B01J 23/52* (2013.01); *B01J 35/0013* (2013.01); *B01J 35/1023* (2013.01); *B01J 35/1028* (2013.01); *B01J 37/035* (2013.01)

(58) Field of Classification Search
CPC ........ B01J 37/084; B01J 23/42; B01J 23/44; B01J 23/52; B01J 21/18; B01J 35/1023; B01J 35/1028
USPC .......... 502/180, 184, 185; 423/308, 311, 445
See application file for complete search history.

(56) References Cited

U.S. PATENT DOCUMENTS

| | | | | |
|---|---|---|---|---|
| 4,066,699 A | * | 1/1978 | Suggitt | B01J 37/06 423/461 |
| 4,532,227 A | * | 7/1985 | Suggitt | B01J 21/18 502/180 |
| 4,968,651 A | | 11/1990 | Crabtree | |
| 5,364,821 A | * | 11/1994 | Holland | B01D 39/06 201/19 |
| 5,883,040 A | * | 3/1999 | Armstrong | C01B 31/10 502/437 |

(Continued)

OTHER PUBLICATIONS

"Preparation and characterization of high surface area, high porosity carbon monoliths from pyrolyzed bovine bone and their performance as supercapacitor electrodes," Paul A. Goodman et al. Carbon 55 (2013), pp. 291-298.*

(Continued)

*Primary Examiner* — Patricia L Hailey
(74) *Attorney, Agent, or Firm* — Stuart H. Nissim

(57) ABSTRACT

Pyrolysis of machined osseous tissue results in a monolith of carbon interwoven within the HA scaffold native to the original tissue. This HA framework prevents the collapse of the carbon to dense forms during pyrolysis. Upon removal of the HA scaffold after pyrolysis, a monolith that preserves the macroscopic form of the carbon remains. The monolith is placed in a solution of catalyst, noble metal ions for example, which is then reduced to facilitate the precipitation of nanoparticles of the catalyst. The novelty of this invention is that a high number of particles are contained within a relatively small, extremely high surface area solid support. The current invention demonstrates that the pyrolysis of intact bovine cortical bone produces high-carbon-surface-area monoliths, which can be used as a scaffold for reusable catalysts.

11 Claims, 2 Drawing Sheets

(56) References Cited

U.S. PATENT DOCUMENTS

| | | | |
|---|---|---|---|
| 6,190,538 B1 | 2/2001 | Gosselink et al. | |
| 7,166,555 B2 | 1/2007 | Shustack et al. | |
| 2003/0060361 A1* | 3/2003 | Chen | B01J 21/18 502/180 |
| 2004/0133045 A1* | 7/2004 | Okanobori | B01J 21/18 568/471 |
| 2012/0288425 A1* | 11/2012 | Klose | C01B 25/222 423/157.5 |

OTHER PUBLICATIONS

"Studies on calcined cow bone and pyrolyzed wood, suitable supports for immobilizing hybrid nano-particles of Co—Mn as new catalysts for oxidation of 2,6-diisopropyl naphthalene," Atefeh Mardani Ghahfarrokhi et al. Applied Catalysis A: General 456 (2013), pp. 51-58.*

"Synthesis and characterization of new hydrodesulphurization Co—Mo catalysts supported on calcined and pyrolyzed bone," M. Emami Yazdani et al. RSC Adv., 2015, 5, pp. 40647-40656.*

* cited by examiner

US 9,468,922 B1

CARBON MONOLITH SUPPORTED NANOPARTICLE CATALYSTS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to the production and use of catalyst composites.

BACKGROUND OF THE INVENTION

Currently, when performing a synthetic process requiring heterogeneous catalysis, particularly those involving noble metals (Pt, Pd, Au), the metal particles are supported on powdered amorphous carbon. Not only is the carbon material messy, it also leads to wasting the valuable noble metal particles. Alternative catalyst supports have been explored. U.S. Pat. No. 4,968,651, issued to R. Crabtree, discloses catalyst bed supports composed of clay and feldspathic sand. Composite catalyst using gelatin, clay or crystalline molecular sieves, and a zeolite beta catalyst with calcination at a temperature in the range of from 300 to 800 degrees C. are the subject of U.S. Pat. No. 6,190,538 issued to Gosselink, et al. In U.S. Pat. No. 7,166,555, Shustack, et al. disclose porous ceramic catalyst supports, pre-coated with a passivation layer comprising gelatin.

The use of noble metal particles for the catalysis of hydrogenation or oxidation reactions is known; the synthesis of noble metal nanoparticles is discussed by Zhang, Y. et al., *Facile synthesis of palladium-graphene nanocomposites and their catalysis for electro-oxidation of methanol and ethanol*, Electrochimica Acta, 2013, pages 570-576, 109.

One common method for producing carbon materials is the pyrolysis of carbon-containing polymers to leave behind a carbon network. The pyrolysis of bovine bone to produce conductive carbon structures for capacitors is disclosed by Goodman, et al., *Preparation and characterization of high surface area, high porosity carbon monoliths from pyrolyzed bovine bone and their performance as supercapacitor electrodes*, Carbon, 2013, 291-298, 55.

The novelty of the present invention using pyrolyzed osseous tissue and nanoparticle catalysts is that a high number of particles are contained within a relatively small, extremely high surface area solid support.

Figure 1:
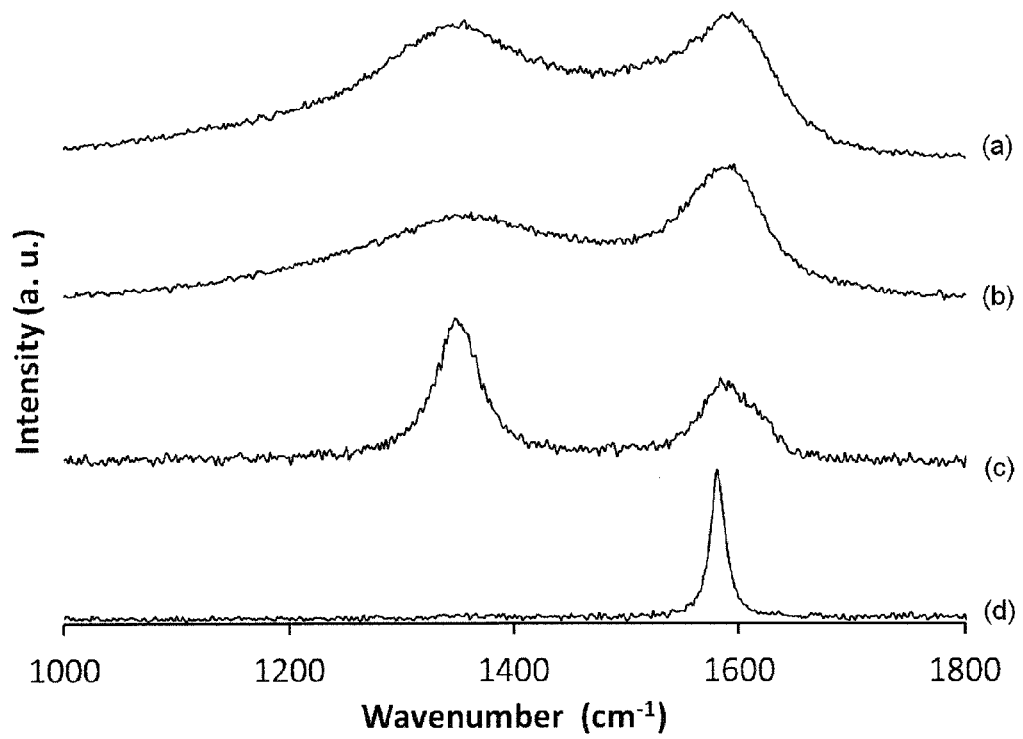
FIG. 1 is a graph showing a comparison of the Raman spectra of various forms of carbon, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

The invention described here is a catalyst monolith, comprising catalyst particles that are supported by a high surface area carbon monolith composite material that is derived from osseous tissue. This is an improvement on the current state of the art because it allows one to drop a catalyst loaded monolith into a reaction vessel and then, upon completion of the reaction, simply lift the monolith out and place it into storage or even into another reaction vessel. This process eliminates the need for filtering upon reaction completion, and also eliminates the need to handle messy, and potentially dangerous, carbon powder.

Preferred embodiments of the present invention relate to novel catalyst loaded monoliths and to a method of making them comprising:
  machining and shaping osseous tissue to a selected size and shape;
  pyrolyzing the tissue to form a carbon/hydroxyapatite composite having a very high surface area;
  loading the carbon/hydroxyapatite composite with soluble catalyst precursor, dispersing the soluble catalyst precursor throughout the carbon/hydroxyapatite composite;
  reducing the catalyst precursor with soluble reducing agent; and
  precipitating catalyst nanoparticles on to the high surface area of the carbon/hydroxyapatite composite.

In preferred embodiments, the osseous tissue can be in one or more of a variety of shapes, including disks, rods, cubes, or other shaped pieces. A preferred embodiment utilizes bovine bone.

Self-supporting carbon monoliths used in the present invention were created by pyrolyzing osseous tissue at temperatures up to about 1000° C., preferably up to about 1200° C. This pyrolyzing process converts the organic components of the bone into high surface area carbon while leaving the supporting hydroxyapatite (HA) inorganic "scaffold" unchanged. The porous structure of the carbon/HA composite allows soluble catalyst, for example, palladium or other metal, to be dispersed within the composite structure. The subsequent addition of a soluble reducing agent causes the reduction of the metal ions to the zero-valent metal which precipitates as nanoparticles on the carbon surface of the composite.

When pyrolysis of the organic components within the bone is performed under the conditions described here, the resulting composites contain carbon interwoven with the structural hierarchy natural to the hydroxyapatite (HA). This natural inorganic structure prevents collapse of the carbon structure during the pyrolysis and is largely conserved at the macroscopic, and to a lesser extent, microscopic scales.

In an alternative embodiment, self-supporting carbon monoliths were prepared by removing the hydroxyapatite with acid or chelating agent, for example, ethylenediaminetetraacetic acid (EDTA). In one such embodiment, the reducing step was performed in an acidic environment causing the HA to be removed from the composite as the metal catalyst particles are being reduced, leaving just the self-supporting carbon structure.

In preferred embodiments, the pyrolyzed bone pieces are loaded with nanoparticles of one or more noble metals. Preferred noble metals include Pd, Pt, Au, and combinations thereof. The resulting carbon monolith/nanoparticle composite can then be used to catalyze chemical reactions requiring such a heterogeneous catalyst. Such a catalyst monolith can be simply added to and removed from a reaction vessel without the need to filter small carbon particles and/or metal particles from the reaction mixture.

Although embodiments of the invention are described in considerable detail, including references to certain versions thereof, other versions are possible. Therefore, the spirit and scope of the appended claims should not be limited to the description of versions included herein.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The following examples are for illustration purposes only and not to be used to limit any of the embodiments.

Example 1

Sample Preparation and Pyrolysis

Cylindrical bone plugs were machined in the longitudinal direction from the diaphyseal section of bovine femurs (Premium Protein Products, Lincoln, Nebr.) with a 6 mm diameter dowel tool. The plugs were sectioned on a lathe into cylindrical disks 6 mm in diameter and 1.5 mm thick. These disks were then stacked in an 8 mm inner diameter quartz tube and heated in vacuo (20 mTorr) using a Thermo Scientific (Waltham, Mass.) Model F46240CM-33 oven with a Eurotherm 2408 temperature controller. The pyrolysis was performed using an adaptation of the heating protocol by described by Törmälä and Romppanen for the preparation of glassy carbon from lignins. The temperature of the bone disks was initially raised rapidly from room temperature to 180° C. over approximately 4 min. The temperature was then increased from 180 to 750° C. at a ramping rate of 18° C./h. Finally, over 5 min the temperature was ramped from 750 to 1000° C., at which point the oven was switched off and allowed to cool passively for 16 hours to room temperature.

Example 2

Scanning Electron Microscopy

The scanning electron micrographs (SEM) provide an intermediate perspective of a representative portion of the monolith after pyrolysis but before extraction of the HA. Under these pyrolysis conditions the macro-scale and mesoscale structures of the original cortical bone are largely preserved. The monoliths display osteon bundles centered on Haversian canals that are approximately 30 µm in diameter. Closer examination also revealed an abundance of smaller lacuna, where osteocytes were previously located, between the lamellae.

Example 3

Hydroxyapatite Removal

Prior to surface area characterization, the HA was removed from pyrolyzed disks by immersing them for 120 hours in 40 mL of a pH 7.5, 500 mM aqueous solution of EDTA. Finally, the samples were rinsed three times (over two hours for each rinsing) in 40 mL of deionized water to remove any remaining EDTA.

The specific surface areas of these monoliths were determined by nitrogen adsorption, and their chemical structure was characterized using Raman spectroscopy. The monoliths exhibit specific surface areas and Raman spectra similar to those of amorphous carbon.

Example 4

Surface Area Measurements

Specific surface areas were measured by nitrogen adsorption using the Brunauer, Emmett, Teller (BET) method. All adsorption measurements were made using a Micromeritics (Norcross, Ga.) ASAP 2020 Surface Area and Porosity Analyzer. Pyrolyzed bone disks produced monoliths with specific carbon surface areas, measured after removal of HA, greater than 1000 $m^2/g$ of carbon, up to at least approximately 1400 $m^2/g$ of carbon.

Example 5

Raman Spectral Analysis

Raman spectroscopy was performed using a Renishaw (Hoffman Estates, Ill.) in Via Dispersive Micro-Raman Spectrometer with an argon laser excitation source at a wavelength of 514.5 nm. Samples were prepared by pressing powdered carbon into a pellet prior to analysis. Fitting of the spectra was performed using OriginPro v 8.0 software (OriginLab, Northampton, Mass.) as reported by Sadezky et al. "Raman microspectroscopy of soot and related carbonaceous materials. Spectral analysis and structural information" Carbon 2005; 43:1731-42. The Raman spectra of carbon materials are well fit by five Lorentzian peaks: G (attributed to an ideal graphitic lattice with E2g symmetry), D1 (attributed to a disordered graphitic lattice with A1g symmetry), D2 (disordered graphitic lattice with E2g symmetry), D3 (amorphous carbon fragments that may include functionalized small molecules), and D4 (disordered graphitic lattice with A1g symmetry, and ionic impurities).

Raman spectroscopy was used to characterize the carbon in the monoliths and comparing it to other forms of carbon. FIG. 1 shows a comparison of the Raman spectra of a representative sample of the carbon monoliths derived from bovine bone of this invention (a), commercial activated carbon (b), glassy carbon (c), and graphite (d). It shows that the spectra of the monolith and that of the activated carbon are quite similar.

Figure 2:
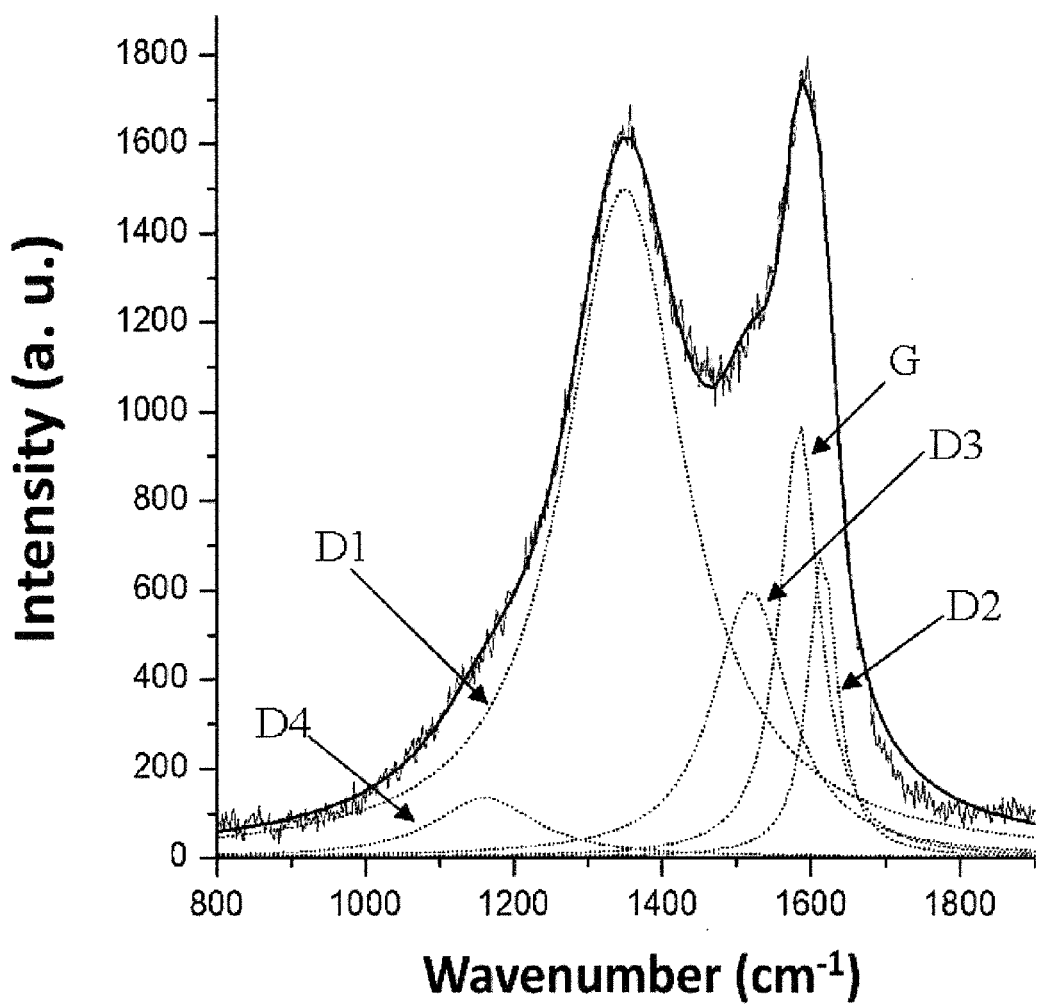
FIG. 2 is a graph showing fitting of the Raman spectra using five Lorentzian peaks of the carbon monolith material according to embodiments of the invention.

FIG. 2 shows that fitting the Raman spectrum using the five Lorentzian peaks suggested by Sadezky et al. provide a spectrum for carbon monoliths that agrees with the qualitative assessment that the monoliths are similar to amorphous activated carbon.

Untreated plugs of cortical bone exhibit a density of approximately 2.0 $g/cm^3$. In this starting material, approximately 75% of the mass is HA, and about 25% is water, collagen, and other organic materials. During the pyrolysis procedure, the organic constituents decompose to produce black materials which contain about 3% Carbon by weight. Removing the HA by chemical means, such as dilute acid or chelating agents, leaves behind monolithic carbon networks with densities of approximately 0.05 g/cm$^3$. These networks exhibit the same high specific carbon surface areas as the carbon/HA composites and are self-supporting.

Example 6

Metal Catalyst Reduction and Deposition 35.3 mg of PdCl$_2$ was dissolved in 10.2 mL of water. 11.0 mg of NaCl was dissolved in 9.6 mL of water. These solutions were mixed together with stirring. An extra 1.6 mg of NaCl was added after about 3 hours to drive the reaction to completion. This reaction forms Na$_2$PdCl$_4$ in solution. After 6 hours of stirring, the solution was filtered and 2 pyrolyzed bone disks (6 mm diameter×1.5 mL height, prepared as indicated in Example 1) were added to the filtrate. A light vacuum was pulled on the vessel for approximately 2 min to remove air from the pores of the pyrolyzed bone disks and the solution was left to sit overnight, so that the tetrachloropallidate ion could penetrate into all of the pores. A small amount of brown precipitate formed on the bottom of the vial overnight. This was filtered off. The filtrate and monoliths were transferred to a 50 mL round bottom flask and 15.5 mL of water containing 696 mg of ascorbic acid was added. An immediate color change from clear orange/yellow to cloudy gray occurred (palladium ion reduced to palladium metal nanoparticles). The round bottom was then placed in an oil bath at 80 degrees C. for 22.5 hours, at which point the heat was removed and the reaction was allowed to passively cool for 4 hours. The precipitate and pyrolyzed bone disks were collected by vacuum filtration, and washed with water and methanol.

Example 7

One of the bone disks was placed into 1 M HCl to remove the hydroxyapatite. After 24 hours this disk was moved into 100 mL of distilled water and soaked for 24 hours to remove the remaining HCl. It was then moved into 20 mL of ethanol and soaked for 6 hours to remove the water. It was then moved into 5 mL 3-heptene, soaked for 2 hours, and then moved to 5 mL of fresh 3-heptene and soaked for an additional 2 hours, to remove any ethanol. The disk was then placed into 3 mL of fresh 3-heptene in a hydrogenation vessel. Hydrogen gas at a pressure of 45 psi was added to the vessel. Over the course of 23 hours without agitation the pressure dropped to 29 psi. At this time the vessel was agitated (shaking) for 6 hours and the pressure dropped to 25.5 psi and remained constant. The vessel was opened. The monolith was partially destroyed, likely due to the shaking, but was partially intact. The product was found to be entirely heptane by NMR.

It was demonstrated that a large portion of the surface area of the carbon is accessible to solvent and electrolyte even without the removal of the HA scaffold. The mechanical strength of the carbon monoliths is relatively low, as may be expected for most materials with very high void volumes and low densities. The compressive strength of the carbonized bone before removing the HA is approximately 800 times larger than the carbon monoliths produced upon removing the HA.

Pyrolysis temperatures above 1200° C. may result in structural changes to the hydroxyapatite and/or carbon which could lower the accessible surface area of the monolith.

The current invention demonstrates that the pyrolysis of intact bovine cortical bone produces high-carbon-surface-area monoliths, which can be used as a reusable scaffold for catalysts.

Major advantages of the invention include, but are not limited to, that a high number of particles are contained within a relatively small, extremely high surface area solid support, lost cost of manufacture, and that such a catalyst monolith can be simply added and removed from a reaction vessel without the need to filter small carbon particles and/or metal particles from the reaction mixture.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A catalyst comprising a support scaffold of pyrolyzed osseous tissue having a high carbon surface area and a plurality of catalyzing nanoparticles deposited thereon; wherein said pyrolyzed osseous tissue comprises a section of bone.

2. The catalyst of claim 1 wherein said pyrolyzed osseous tissue has been pyrolyzed at < about 1200° C.

3. The catalyst of claim 1 wherein said pyrolyzed osseous tissue has a carbon surface area of at least 1000 m2/g as measured by the BET method.

4. The catalyst of claim 3 wherein said pyrolyzed osseous tissue has a carbon surface area of at least 1400 m2/g as measured by the BET method.

5. The catalyst of claim 1 wherein said catalyzing nanoparticles are noble metal nanoparticles.

6. The catalyst of claim 5 wherein said catalyzing nanoparticles are Pt, Pd, Au, or combinations thereof.

7. The catalyst of claim 1 wherein any hydroxyapatite present in said pyrolyzed osseous tissue has been removed.

8. A catalyst loaded osseous tissue monolith comprising a pyrolyzed osseous tissue scaffold comprising a section of bone which has been pyrolyzed at < about 1200° C. and a plurality of noble metal nanoparticles.

9. A process for creating a monolithic heterogeneous catalyst comprising:
supplying at least one section of osseous tissue comprising a section of bone;
heating said osseous tissue to a temperature < about 1200° C. to form a porous structure of carbon/hydroxyapatite composite;
placing said carbon/hydroxyapatite composite in a solution of catalyst; and,
treating said solution to facilitate the precipitation of nanoparticles of said catalyst.

10. The process of claim 9 wherein said heating is performed at a temperature up to about 1000° C.

11. The process of claim 9 wherein after said heating, said hydroxyapatite is removed from said composite.

* * * * *